United States Patent
Rosa et al.

(10) Patent No.: US 12,374,993 B2
(45) Date of Patent: Jul. 29, 2025

(54) DC-DC CONVERTER CIRCUIT, CORRESPONDING METHOD OF OPERATION AND METHOD OF TRIMMING A DC-DC CONVERTER CIRCUIT

(71) Applicant: STMicroelectronics S.r.l., Agrate Brianza (IT)

(72) Inventors: Tommaso Rosa, Milan (IT); Alessandro Bertolini, Vermiglio (IT); Stefano Ramorini, Milan (IT); Alberto Cattani, Cislago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 225 days.

(21) Appl. No.: 18/214,646

(22) Filed: Jun. 27, 2023

(65) Prior Publication Data

US 2024/0006994 A1 Jan. 4, 2024

(30) Foreign Application Priority Data

Jul. 4, 2022 (IT) .................. 102022000014068

(51) Int. Cl.
*H02M 3/158* (2006.01)
(52) U.S. Cl.
CPC .................... *H02M 3/158* (2013.01)
(58) Field of Classification Search
CPC ................................................ H02M 3/158
See application file for complete search history.

(56) References Cited

U.S. PATENT DOCUMENTS

| 5,940,782 | A | 8/1999 | Gottshall et al. |
| 2010/0148741 | A1 | 6/2010 | Chen et al. |
| 2015/0022174 | A1* | 1/2015 | Nikitin ................... H02M 3/157 323/282 |

(Continued)

FOREIGN PATENT DOCUMENTS

| CN | 103561509 A | 2/2014 |
| JP | 62211715 A | 9/1987 |
| JP | 10132601 A | 5/1998 |

OTHER PUBLICATIONS

IT Search Report and Written Opinion for priority application, IT Appl. 102022000014068, report dated Jan. 23, 2023, 7 pgs.

(Continued)

*Primary Examiner* — Rafael O De Leon Domenech
(74) *Attorney, Agent, or Firm* — Crowe & Dunlevy LLC (57) ABSTRACT

A DC-DC boost converter includes an input receiving an input voltage and an output producing an output voltage. A switching stage is formed by a low-side transistor arranged between a switching node and a ground node, and a high-side transistor arranged between the switching node and the output. The high-side transistor includes a body diode having an anode coupled to the switching node and a cathode coupled to the output. The converter is controlled in an asynchronous operation mode where the low-side transistor is driven alternately to a conductive state and a non-conductive state, and the high-side transistor is driven steadily to a non-conductive state. A variable load circuit is selectively coupled between the two output terminals when the converter is in the asynchronous operation mode in order to sink a load current having a value that is a function of a value of the input voltage.

20 Claims, 5 Drawing Sheets

(56) References Cited

U.S. PATENT DOCUMENTS

2018/0041123 A1* 2/2018 Matsushima .......... H02M 1/08
2020/0358367 A1 11/2020 Yang et al.

OTHER PUBLICATIONS

Chen Wei-Chung et al: "A Switchable Digital-Analog Low-Dropout Regulator for Analog Dynamic Voltage Scaling Techn", IEEE Journal of Solid-State Circuits, IEEE, USA, vol. 49, No. 3, pp. 740-750, XP011541967, ISSN: 0018-9200, DOI: 10.1109/JSSC. 2013.2297395 [retrieved on Mar. 5, 2014] Section V. Experimental Results; Equation 1; figures 5b,6,7,9,13,15.

* cited by examiner

DC-DC CONVERTER CIRCUIT, CORRESPONDING METHOD OF OPERATION AND METHOD OF TRIMMING A DC-DC CONVERTER CIRCUIT

PRIORITY CLAIM

This application claims the priority benefit of Italian Application for Patent No. 102022000014068 filed on Jul. 4, 2022, the content of which is hereby incorporated by reference in its entirety to the maximum extent allowable by law.

TECHNICAL FIELD

The description relates to DC-DC boost switching converters and, in particular, to synchronous boost converters that may be operated in "asynchronous mode" or "diode mode".

BACKGROUND

Boost DC-DC converters are widely used in applications where it is necessary to produce an output voltage $V_{out}$ that is higher than the input voltage $V_{in}$. In particular, synchronous boost converters, which are based on an architecture including a low-side switch and a high-side switch (e.g., transistors), are employed for this purpose when high efficiency is required.

In some applications, such as the driving of Active-Matrix Organic Light-Emitting Diode (AMOLED) panels, a boost converter may be demanded to regulate the output voltage $V_{out}$ even when the input voltage $V_{in}$ is near to, equal to or even slightly higher than the target output voltage $V_{out}$. A conventional synchronous boost converter may not be able to fulfill such a requirement. However, as long as the maximum input voltage $V_{in}$ is only slightly higher (e.g., a few hundred millivolts higher) than the target output voltage $V_{out}$, a synchronous boost converter can forego operating synchronously and operate asynchronously instead, by keeping the high-side transistor (e.g., metal-oxide-semiconductor field-effect transistor, MOSFET) in a non-conductive state (e.g., off) and employing the body diode of the high-side transistor to conduct electric current from the converter switching node to the converter output node. This mode of operation, where a synchronous (i.e., two-switch) boost converter operates asynchronously by halting the switching activity of the high-side transistor, is called diode mode.

The same applications discussed above (e.g., driving of AMOLED panels) may additionally require the DC-DC converter to never enter the skip mode of operation (i.e., a mode of operation where the converter "skips a beat" in order to maintain the output voltage regulation when faced with very light load conditions), since this mode of operation results in a larger ripple of the output voltage $V_{out}$ and variable frequency. The requirement of never entering the skip mode of operation can be easily fulfilled by a synchronous boost converter that can operate in forced continuous conduction mode (CCM), but can be problematic for a boost converter that operates in diode mode, due to the asynchronous nature of the latter operation mode.

Therefore, there is a need in the art to provide DC-DC boost converters that can operate in diode mode and avoid entering the skip mode of operation, while providing at the same time a high efficiency.

SUMMARY

One or more embodiments may relate to a DC-DC boost converter circuit.

One or more embodiments may relate to a corresponding method of operating a DC-DC boost converter.

One or more embodiments may relate to corresponding methods of trimming a DC-DC boost converter.

According to a first aspect of the present description, a DC-DC boost converter circuit includes a first input terminal and a second input terminal configured to receive an input voltage therebetween, and a first output terminal and a second output terminal configured to produce an output voltage therebetween. The converter includes a switching stage including a low-side switching transistor arranged between a switching node and a ground node, and a high-side switching transistor arranged between the switching node and the first output node. The ground node is coupled to the second input terminal and to the second output terminal. The high-side switching transistor includes a body diode having an anode terminal coupled to the switching node and a cathode terminal coupled to the first output node. The converter includes a control circuit configured to control operation of the switching stage. The control circuit can control the switching stage in an asynchronous operation mode where the control circuit drives the low-side switching transistor alternately to a conductive state and a non-conductive state, and drives the high-side switching transistor steadily to a non-conductive state. The converter includes a variable load circuit selectively couplable between the first output terminal and the second output terminal to sink a load current from the first output terminal. The variable load circuit is coupled between the first output terminal and the second output terminal in response to the control circuit controlling the switching stage in the asynchronous operation mode, and the variable load circuit is configured to sink the load current having a value that is a function of a value of the input voltage.

One or more embodiments may thus facilitate avoiding operation of a boost converter in skip mode when the converter operates in diode mode, while providing a high conversion efficiency.

In one or more embodiments, the variable load circuit is configured to sink the load current having a value that is linearly dependent on the input voltage.

In one or more embodiments, the variable load circuit includes a differential input pair including a first input transistor and a second input transistor. The first input transistor has a control terminal configured to receive a reference voltage, and the second input transistor has a control terminal configured to receive a feedback voltage indicative of the input voltage and is configured to sink a transistor current from a current adder node. The variable load circuit includes a current mirror circuit arrangement coupled to second input transistor at the current adder node and configured to mirror and re-scale a current sunk by the current adder node to produce the load current. The load current sunk by the variable load circuit is produced as a function of the transistor current sunk by the second input transistor from the current adder node.

In one or more embodiments, the variable load circuit includes a voltage divider circuit configured to receive the input voltage and produce, at an intermediate node thereof, the feedback voltage proportional to the input voltage.

In one or more embodiments, the variable load circuit includes a first trimmable resistor coupled between the first input transistor and a current biasing node, and a second trimmable resistor coupled between the second input transistor and the current biasing node. The variable load circuit includes a current source coupled between the current biasing node and the ground node and configured to sink a biasing current from the current biasing node. The variable load circuit includes a further current source coupled between a further current biasing node and the ground node, and is configured to sink a further biasing current from the further current biasing node. The variable load circuit includes a further trimmable current mirror circuit arrangement configured to mirror and re-scale the further biasing current to inject an offset current into the current adder node.

In one or more embodiments, the control circuit comprises a memory configured to store a slope trimming value, and a resistance value of the first trimmable resistor and of the second trimmable resistor is trimmable as a function of the stored slope trimming value.

In one or more embodiments, the control circuit includes a memory configured to store an offset trimming value, and a mirroring ratio of the further trimmable current mirror circuit arrangement is trimmable as a function of the stored offset trimming value.

In one or more embodiments, the first input transistor and the second input transistor are trimmable transistors and are directly coupled to a current biasing node. The variable load circuit comprises a trimmable current source coupled between the current biasing node and the ground node and configured to sink a variable biasing current from the current biasing node.

In one or more embodiments, the control circuit includes a memory configured to store a slope trimming value, and a transconductance value of the differential input pair is trimmable as a function of the stored slope trimming value.

In one or more embodiments, the control circuit includes a memory configured to store an offset trimming value, and a value of the variable biasing current is trimmable as a function of the stored offset trimming value.

According to another aspect of the present description, a method of operating a DC-DC boost converter according to one or more embodiments includes: receiving an input voltage between the first input terminal and the second input terminal; producing an output voltage between the first output terminal and the second output terminal; controlling operation of the switching stage in an asynchronous operation mode by driving the low-side switching transistor alternately to a conductive state and a non-conductive state and driving the high-side switching transistor steadily to a non-conductive state; coupling the variable load circuit between the first output terminal and the second output terminal in response to the switching stage being controlled in the asynchronous operation mode; and sinking, via the variable load circuit, a load current having a value that is a function of a value of the input voltage.

According to another aspect of the present description, a method of trimming a DC-DC boost converter according to one or more embodiments includes: i) operating the converter circuit in the asynchronous operation mode for a selected value of the input voltage with no external load coupled to the first output node; ii) increasing a current output by the converter circuit until the switching activity of the converter circuit does not skip pulses; iii) storing the current value of the current output by the converter circuit at which the converter circuit stops skipping pulses; iv) repeating steps i) to iii) for different selected values of the input voltage and storing the respective values of the current output by the converter circuit at which the converter circuit stops skipping pulses; and v) determining the slope trimming value and/or the offset trimming value so that the variable load circuit sinks, at the selected values of the input voltage, the load current equal to or higher than the current output by the converter circuit.

In one or more embodiments, the trimming method comprises trimming the first trimmable resistor and the second trimmable resistor as a function of the slope trimming value, and/or trimming the further trimmable current mirror circuit arrangement as a function of the offset trimming value (e.g., storing the slope trimming value and/or the offset trimming value into a memory of the control circuit).

In one or more embodiments, the trimming method comprises trimming the trimmable current source as a function of the offset trimming value, and/or trimming the trimmable input transistors as a function of the slope trimming value (e.g., storing the slope trimming value and/or the offset trimming value into a memory of the control circuit).

BRIEF DESCRIPTION OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

Figure 1:
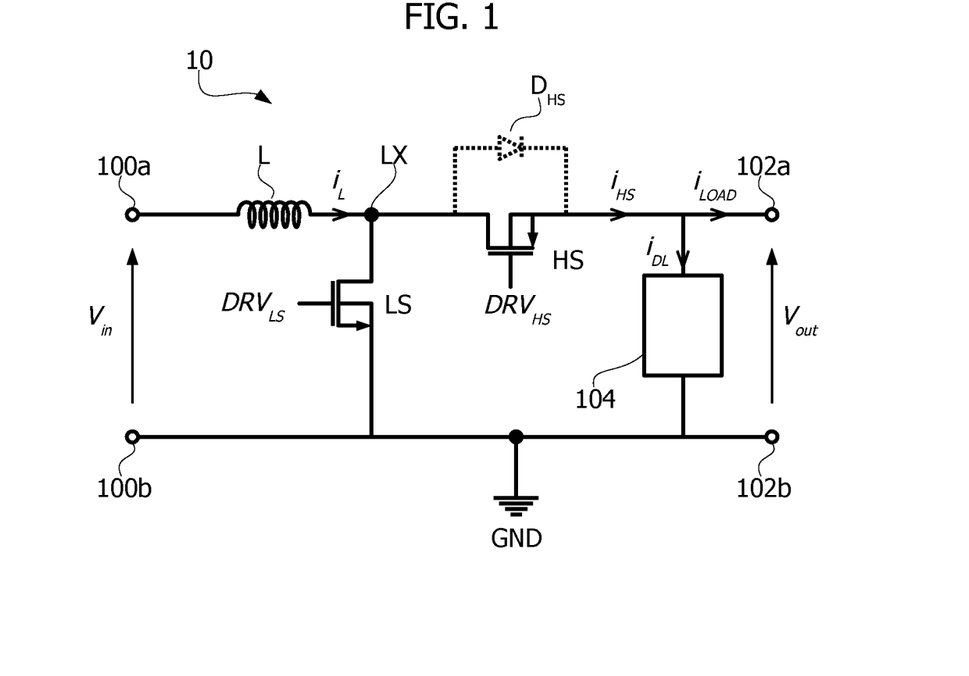
FIG. 1 is a circuit block diagram exemplary of a boost DC-DC converter according to one or more embodiments of the present description.

By way of introduction to the detailed description of exemplary embodiments, reference may first be made to FIG. 1, which is a circuit block diagram exemplary of a boost DC-DC converter 10 that can operate in diode mode (asynchronous mode).

The boost converter 10 includes a pair of input nodes 100a, 100b (first and second input nodes) configured to receive a DC input voltage $V_{in}$ and a pair of output nodes 102a, 102b (first and second output nodes) configured to produce (e.g., regulate) a DC output voltage $V_{out}$. For instance, node 100a may be a positive input node and node 100b may be a negative or reference input node connected to a ground node GND, while node 102a may be a positive output node and node 102b may be a negative or reference output node also connected to ground node GND. Converter 10 includes a low-side switch LS (e.g., a low-side transistor, such as a MOS transistor) arranged between a switching node LX and the ground node GND, and a high-side switch HS (e.g., a high-side transistor, such as a MOS transistor) arranged between the switching node LX and the first output node 102a. The high-side switch HS receives, from a control circuit of converter 10 (not explicitly shown, but of configuration known to those skilled in the art), a control signal $DRV_{HS}$ at a control terminal thereof (e.g., a gate terminal of MOS transistor HS). Similarly, the low-side switch LS receives, from the control circuit of converter 10, a control signal $DRV_{LS}$ at a control terminal thereof (e.g., a gate terminal of MOS transistor LS). Therefore, the switching stage HS, LS of converter 10 can be driven in different operation modes by the control circuit of converter 10. An inductor L (e.g., an external inductor, not incorporated into the integrated circuit of converter 10) may be arranged between the first input node 100a and the switching node LX to operate the boost converter 10. A capacitor (e.g., an external capacitor, not explicitly shown, but of configuration known to those skilled in the art) may be arranged between the first output node 102a and the second output node 102b to stabilize operation of the boost converter 10.

As previously discussed, in certain applications the boost converter 10 may be operated in an asynchronous mode (e.g., in diode mode) in order to cope with an input voltage $V_{in}$ that is close to, equal to or even slightly higher than the target output voltage $V_{out}$. In this operation mode, the high-side transistor HS is kept steadily in a non-conductive state (e.g., off), and during the high-side conduction phase the inductor current $i_L$ is passed to the output node 102a (i.e., it flows from the switching node LX to the output node 102a) through the body diode DHS of the high-side transistor HS.

In order to avoid entering the skip mode of operation when operating in diode mode, the converter 10 includes a load circuit 104 (e.g., a "dummy load" circuit) arranged between the output nodes 102a, 102b and configured to sink a current $i_{DL}$ from node 102a, when it is activated, so that the output current $i_{HS}$ provided by the switching stage of converter 10 (i.e., flowing through the high-side switch HS) is equal to the sum of the current $i_{LOAD}$ actually provided to the external load (not explicitly shown, but of configuration known to those skilled in the art) and the "dummy load" current $i_{DL}$. The load circuit 104 is activated (e.g., via a control signal produced by the control circuit of converter 10) when the converter 10 enters the diode mode operation, and sinks a current $i_{DL}$ so that the overall output current $i_{HS}$ provided by converter 10 stays above the minimum output current threshold that would lead the converter 10 to operate in skip mode.

Figure 2:
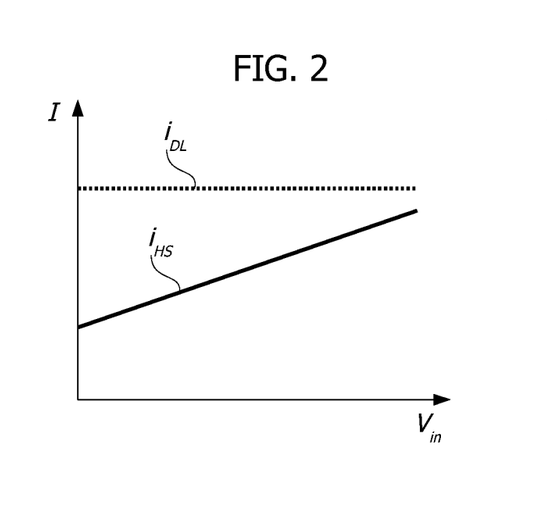
FIG. 2 is a diagram exemplary of the minimum output current that the switching stage of a boost converter has to provide in order to avoid skipping as a function of the input voltage, and a corresponding fixed dummy load current that a dummy load has to sink from the output node to avoid skipping even at very light load or zero load.

According to a possible simple implementation, the load circuit 104 may be configured to sink a fixed (e.g., constant) current $i_{DL}$ from node 102a. In this case, the value of the current $i_{DL}$ should be chosen (i.e., the load circuit 104 should be sized, trimmed) so to ensure that the converter 10 will never enter the skip mode for all possible combinations of values of the input voltage $V_{in}$ and output voltage $V_{out}$ (i.e., across the entire input voltage range and output voltage range). In this case, the load circuit 104 may include a simple, fixed current mirror. However, it is noted that the amount of output current $i_{HS}$ necessary to avoid the skip operation mode increases (e.g., linearly) as a function of the input voltage $V_{in}$. Therefore, since in this example the current $i_{DL}$ is constant, it has to be sized for the worst case (e.g., maximum input voltage $V_{in}$ and minimum load current $i_{LOAD}$ actually sunk by the external load). FIG. 2 is a diagram exemplary of the minimum output current $i_{HS}$ that the switching stage of converter 10 has to provide in order to avoid skipping as a function of the input voltage $V_{in}$, and the corresponding fixed "dummy load" current $i_{DL}$ that a fixed load 104 should sink from node 102a to guarantee that the converter 10 will not enter skip mode, even if the actual current $i_{LOAD}$ sunk by the external load is zero or almost zero. As exemplified in FIG. 2, at low values of the input voltage $V_{in}$, the difference between current $i_{DL}$ and current $i_{HS}$, which is a wasted current, becomes large. This means that, if a fixed current $i_{DL}$ is sunk from node 102a, more current is wasted than what would really be necessary to prevent the boost converter from skipping, except when the input voltage $V_{in}$ is at its maximum value. At lower values of the input voltage $V_{in}$, a lower "dummy load" current could be used while still avoiding operation of converter 10 in skip mode.

Figure 3:
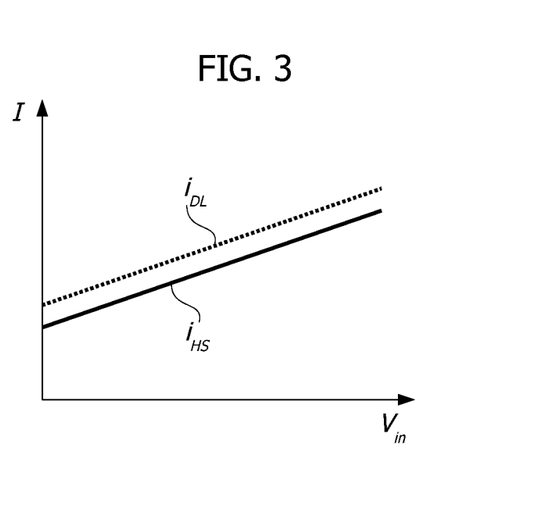
FIG. 3 is a diagram exemplary of the minimum output current that the switching stage of a boost converter has to provide in order to avoid skipping as a function of the input voltage, and a corresponding variable dummy load current that a variable dummy load may sink from the output node to avoid skipping even at very light load or zero load, according to one or more embodiments of the present description.

Therefore, one or more embodiments may include a load circuit 104 configured to sink a variable current $i_{DL}$ from node 102a, in particular a current $i_{DL}$ that varies (e.g., linearly increases) as a function of the input voltage $V_{in}$ as exemplified in FIG. 3. By increasing the "dummy load" current $i_{DL}$ as a function of (e.g., proportionally to) the input voltage $V_{in}$, it is possible to match the curve of current $i_{DL}$ to the curve of the minimum load current $i_{HS}$ of the converter 10 (optionally maintaining a small offset between the two curves, as exemplified in FIG. 3), thereby ensuring that the converter 10 does not enter skip mode of operation (particularly when operating in diode mode) without wasting any unnecessary current or keeping the current waste at a very low level.

Figure 4:
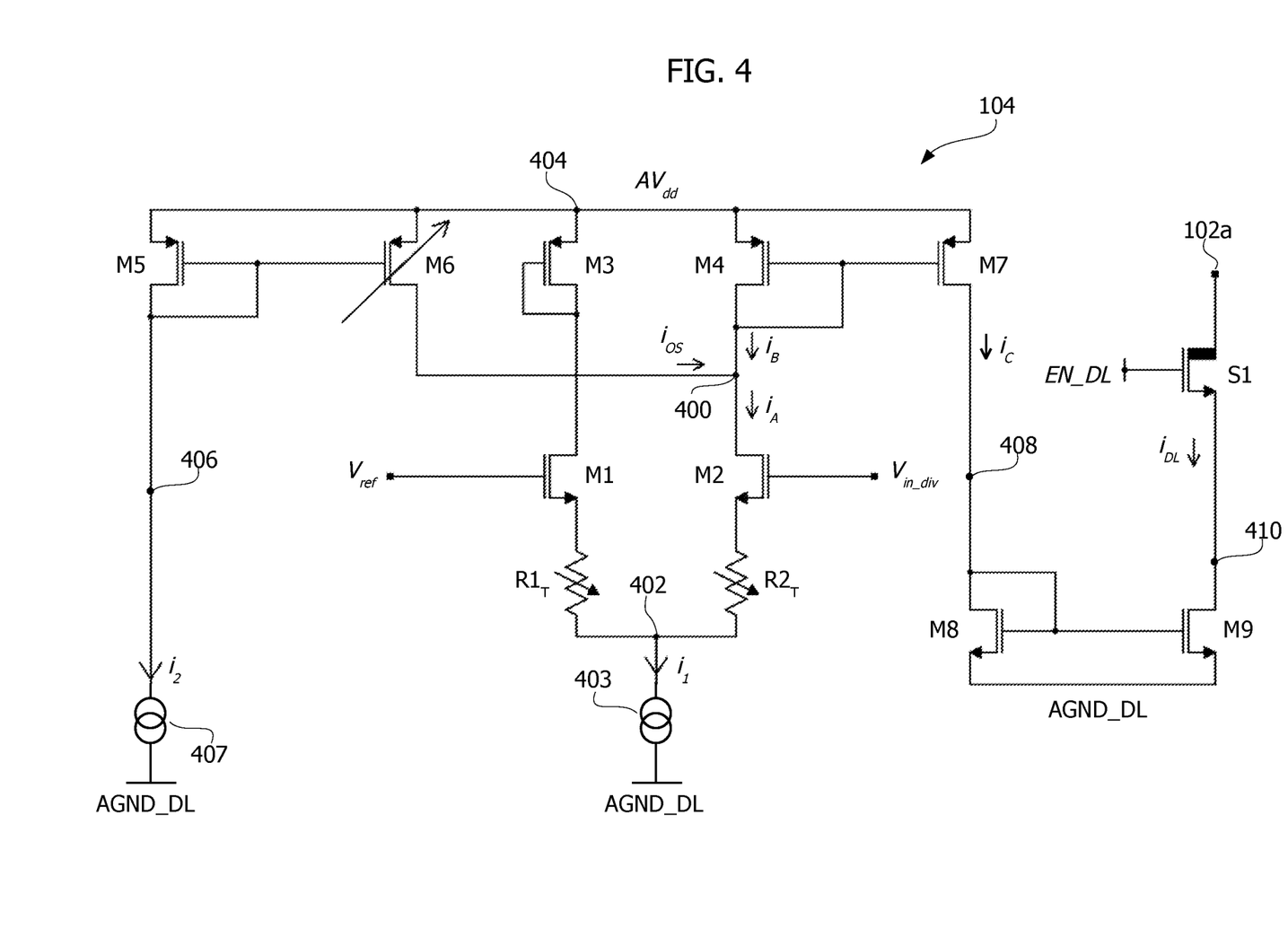
FIG. 4 is a circuit diagram exemplary of a possible implementation of a variable load circuit according to one or more embodiments of the present description.

FIG. 4 is a circuit diagram exemplary of a possible implementation of a variable load circuit 104 according to one or more embodiments of the present description.

The variable load circuit 104 of FIG. 4 comprises a differential input pair that includes a first transistor M1 (e.g., an n-channel MOS transistor) and a second transistor M2 (e.g., an n-channel MOS transistor). Transistor M1 has a source terminal coupled to a first terminal of a first trimmable resistor $R1_T$, a gate terminal configured to receive a reference voltage $V_{ref}$, and a drain terminal coupled to a drain terminal of a further transistor M3 (e.g., a p-channel MOS transistor). Transistor M2 has a source terminal coupled to a first terminal of a second trimmable resistor $R2_T$, a gate terminal configured to receive a voltage $V_{in\_div}$ indicative of (e.g., proportional to) the input voltage $V_{in}$, and a drain terminal coupled to a drain terminal of a further transistor M4 (e.g., a p-channel MOS transistor) at a node 400. The second terminal of resistor $R1_T$ and the second terminal of resistor $R2_T$ are coupled to a same node 402. A current source 403 (e.g., a "zero-change to absolute temperature", ZTAT, current source) is coupled between node 402 and a ground node AGND_DL and is configured to sink from node 402 a constant (e.g., fixed) current $i_I$ (e.g., a current of about 10 µA). It is noted that the ground node GND of FIG. 1 and the ground node AGND_DL of FIG. 4 are indicated with different references only insofar as the two schematics of these two Figures refer to different hierarchical levels, but in the final product (e.g., an integrated circuit) they may actually correspond to a same ground node (e.g., they may be shorted together).

In order to produce voltage $V_{in\_div}$, the variable load circuit 104 may include a (resistive) voltage divider or voltage ladder circuit. For instance, the voltage divider may include a first resistor having resistance r1 and a second resistor having resistance r2 arranged in series between the input node 100*a* and the ground node GND so that the input voltage $V_{in}$ drops across the voltage divider, and voltage $V_{in\_div}$ is produced at a node intermediate the first and second resistor of the voltage divider (i.e., $V_{in\_div}=r2/(r1+r2) \cdot V_{in}$).

Transistor M3 may have a source terminal coupled to a supply rail 404 configured to provide a supply voltage $AV_{dd}$, and a gate terminal coupled to its drain terminal (diode-connected transistor M3). Therefore, transistor M3 may be configured to be constantly in a conductive state and connect the conductive channel of transistor M1 to the supply rail 404.

The variable load circuit 104 may include a trimmable current generator (e.g., a current mirror) configured to source a constant current $i_{OS}$ (offset current) to node 400. For instance, as exemplified in FIG. 4, such a current generator includes a transistor M5 (e.g., a p-channel MOS transistor) having a source terminal coupled to the supply rail 404, a drain terminal coupled to a node 406, and a gate terminal coupled to its drain terminal. A current source 407 (e.g., a "zero-change to absolute temperature", ZTAT, current source) is coupled between node 406 and the ground node AGND_DL and is configured to sink from node 406 a constant (e.g., fixed) current $i_2$ (e.g., a current of about 1 µA). The current generator includes a trimmable transistor M6 (e.g., a p-channel MOS transistor or a plurality of parallel-connectable p-channel MOS transistors) having a source terminal coupled to the supply rail 404, a drain terminal coupled to node 400, and a gate terminal coupled the gate terminal of transistor M5. Therefore, the value of the offset current $i_{OS}$ may be set by trimming transistor M6.

The variable load circuit 104 may further include current mirroring circuitry configured to mirror and optionally amplify the current $i_B$ sunk at node 400 from the drain terminal of transistor M4 to produce the "dummy load" current $i_{DL}$. The current equation at node 400 shows that $i_B=i_A-i_{OS}$, i.e., the current $i_B$ that flows through transistor M4 is equal to the difference between the current $i_A$ that flows through transistor M2 and the current $i_{OS}$ that flows through trimmable transistor M6. Transistor M4 has source terminal coupled to the supply rail 404, a drain terminal coupled to node 400, and a gate terminal coupled to its drain terminal (at node 400). The current mirror includes a transistor M7 (e.g., a p-channel MOS transistor) having a source terminal coupled to the supply rail 404, a drain terminal coupled to a node 408, and a gate terminal coupled the gate terminal of transistor M4, so that current $i_B$ is mirrored and optionally amplified to produce a current $i_C$ that flows through transistor M7. The mirroring factor (ratio) of the current mirror that includes (e.g., is made up by) transistors M4 and M7 may be, for instance, 1:32 (i.e., $i_C=i_B \cdot 32$). A further current mirror including transistors M8 and M9 may be configured to mirror and optionally amplify the current $i_C$ sourced by the drain terminal of transistor M7 to produce the "dummy load" current $i_{DL}$. In particular, transistor M8 (e.g., an n-channel MOS transistor) has a source terminal coupled to the ground node AGND_DL, a drain terminal coupled to node 408, and a gate terminal coupled to its drain terminal (at node 408). Transistor M9 (e.g., an n-channel MOS transistor) has a source terminal coupled to the ground node AGND_DL, a drain terminal coupled to a node 410, and a gate terminal coupled the gate terminal of transistor M8, so that current $i_C$ is mirrored and optionally amplified to produce a current $i_{DL}$ that flows through transistor M9. The mirroring factor (ratio) of the current mirror that includes (e.g., is made up by) transistors M8 and M9 may be, for instance, 1:80 (i.e., $i_{DL}=i_C \cdot 80$).

A switch S1 (e.g., an n-channel MOS transistor) may be arranged between node 410 and node 102*a* to selectively couple and decouple transistor M9 to and from node 102*a*, in order to selectively enable and disable the dummy load circuit 104 during operation of converter 10. In particular, switch S1 may receive a respective enable signal EN_DL and may be closed or conductive (respectively, open or non-conductive) when the enable signal EN_DL is asserted, e.g., EN_DL=1.8 V (respectively, de-asserted, e.g., EN_DL=0 V). The enable signal EN_DL may be produced by a control circuit of converter 10 (not visible in the figures annexed herein), e.g., the same control circuit that drives the high-side switch HS and the low-side switch LS.

In one or more embodiments, the dummy load circuit 104 may thus operate as discussed in the following. When the boost converter 10 operates in normal mode, the load circuit 104 is disabled (i.e., the enable signal EN_DL is de-asserted, e.g., EN_DL=0, and the load circuit 104 is kept off and/or decoupled from the output node 102*a*). When the converter 10 enters diode-mode operation, the load circuit 104 is enabled (i.e., the enable signal EN_DL is asserted, e.g., EN_DL=1.8 V, and the load circuit 104 is turned on and coupled to the output node 102*a*). The two voltages $V_{ref}$ and $V_{in\_div}$ received at the differential pair M1, M2 are selected such that they are very close (ideally equal one to another) when the boost converter 10 enters diode-mode operation. In this way, the current $i_A$ sunk from node 400 by transistor M2 will be approximately half of the tail current $i_I$ sunk from node 402 by the current source 403 (e.g., $i_I$=10 µA, $i_A=i_I/2$=5 µA). The trimmable offset current $i_{OS}$ is then subtracted from current $i_A$ at node 400 to produce current $i_B$ that is forced to flow through transistor M4, i.e., through the first branch of the output current mirroring circuitry. Current $i_B$ is thus mirrored and amplified to produce the final "dummy load" current $i_{DL}$ (in the example discussed previously, $i_{DL}=i_B \cdot 32 \cdot 80=i_B \cdot 2560$). By trimming the value of the offset current $i_{OS}$, it is possible to change the initial offset of the output current $i_{DL}$: $i_{DL}=i_B \cdot 2560=(i_A-i_{OS}) \cdot 2560$. As the input voltage $V_{in}$ increases, the differential pair M1, M2 will unbalance, thus increasing the current $i_B$ (insofar as the offset current $i_{OS}$ is constant) and therefore the output current $i_{DL}$. By trimming the trimmable resistors $R1_T$, $R2_T$ of the differential pair, it is possible to change the slope of current $i_{DL}$ as a function of voltage $V_{in}$ (in particular, a lower resistance of resistors $R1_T$ and $R2_T$ results in a steeper curve of $i_{DL}$ vs. $V_{in}$). During trimming, both resistors $R1_T$ and $R2_T$ can be increased or decreased by the same amount, in order to change the transconductance of the differential pair without introducing any offset, which would change the initial offset value. Assuming that the value of resistance of the resistors $R1_T$ and $R2_T$ is much larger than the transconductance $g_m$ of the MOS transistors M1, M2 of the differential pair, the slope of the current $i_{DL}$ as a function of the input voltage $V_{in}$ (i.e., the slope of the line $i_{DL}$ illustrated in FIG. 3) can be calculated—for the specific example considered herein—as:

$$\frac{\delta i_{DL}}{\delta V_{in}} = \frac{r2}{r1+r2} \cdot \frac{2560}{2R_{Trim}}$$

where $R_{Trim}$ is the resistance of resistors $R1_T$ and $R2_T$.

Figure 5:
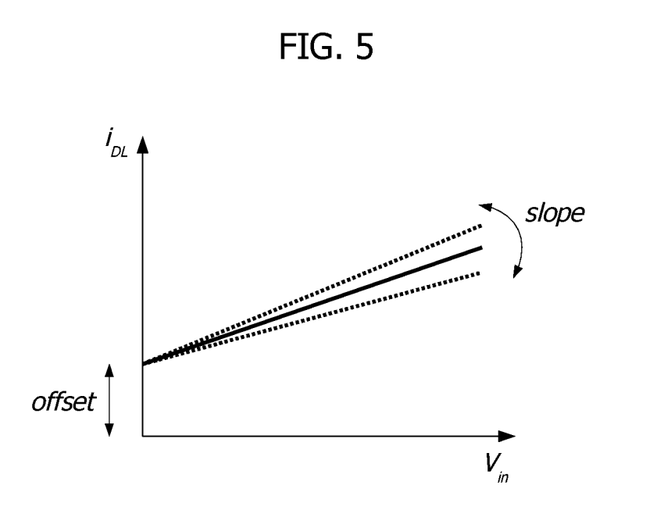
FIG. 5 is a diagram exemplary of the possibility of trimming a variable load circuit according to one or more embodiments of the present description.

FIG. 5, in particular, is exemplary of possible dependencies of the current $i_{DL}$ as a function of the input voltage $V_{in}$ with varying slopes (which depend on the trimmable values of resistors $R1_T$ and $R2_T$) and offsets (which depend on the trimmable value of current $i_{OS}$, e.g., on the trimmable mirroring factor of the current mirror M5, M6).

Trimming of transistor M6 and of resistors $R1_T$ and $R2_T$ can be carried out according to various possibilities. For instance, the control circuit of converter 10 may include a memory configured to store the trimming information for transistor M6 and of resistors $R1_T$ and $R2_T$, and these devices may be driven according to the stored trimming values. For instance, trimmable transistor M6 may include a plurality of parallel-connected transistors, and a subset of such plurality of transistors may be selected to operate as a function of a first trimming value stored in the memory (e.g., an offset trimming value). Similarly, each of the trimmable resistors $R1_T$ and $R2_T$ may include a plurality of fixed resistors selectively connectable in series and/or in parallel, and the series/parallel configuration of resistors $R1_T$ and $R2_T$ may be selected as a function of a second trimming value stored in the memory (e.g., a slope trimming value).

One or more embodiments may thus relate to a method of trimming a "dummy load" circuit 104 for a boost converter 10. For instance, in order to correctly determine the shape of the skipping threshold current curve of the boost converter 10 when operating in diode mode (i.e., substantially the shape of current $i_{HS}$ illustrated in FIG. 3), the trimming method may include the following steps:
  i) activating the boost converter 10 in diode mode at a certain value of the input voltage $V_{in}$, with no external load coupled to the output node 102a, so that the converter will likely operate in skip mode in this condition;
  ii) slowly increasing the current $i_{HS}$ output by the converter until the converter stops skipping pulses (i.e., until the converter exits from the skip mode);
  iii) storing the value $i_{HS1}$ of the current $i_{HS}$ output by the converter at which the converter stops skipping; and
  iv) repeating steps i) to iii) at different values of the input voltage $V_{in}$ (e.g., for the whole range of input voltage $V_{in}$ in which the converter 10 operates in diode mode) to store the respective values $i_{HS2}, \ldots, i_{HSn}$ of the current $i_{HS}$ at which the converter stops skipping for different values of $V_{in}$.

Figure 6:
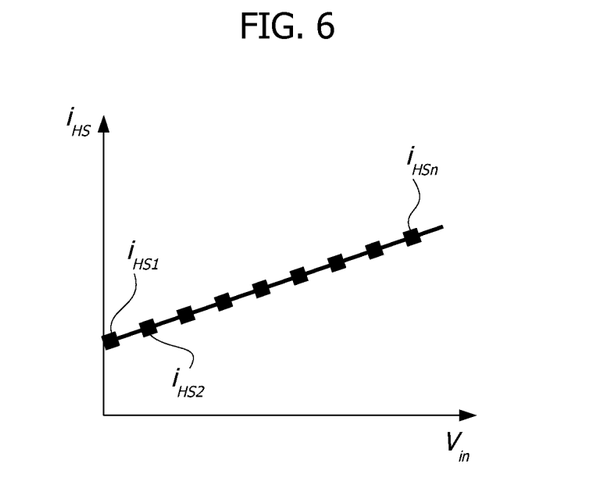
FIG. 6 is a diagram exemplary of a step of a method of trimming a boost DC-DC converter according to one or more embodiments of the present description.

The slope and offset of the "output current $i_{HS}$ vs. input voltage $V_{in}$" relationship (as exemplified in FIG. 6) resulting from the execution of steps i) to iv) above will be the slope and offset of the "dummy load current $i_{DL}$ vs. input voltage $V_{in}$" relationship that the "dummy load" circuit 104 has to reproduce, which can be written in the form $i_{DL}=I_0+\alpha \cdot V_{in}$. Therefore, the trimming method may further comprise determining the offset trimming value $I_0$ and/or the slope trimming value a so that the load current $i_{DL}$ produced by the variable load circuit 104 substantially reproduces, at different values of the input voltage $V_{in}$, the current $i_{HS}$ output by the converter circuit 10, possibly with a small offset as exemplified in FIG. 3. Once determined, these trimming values can be stored into the trimming memory of the control circuit of converter 10, and used to select the values of the mirroring factor of transistor M6 (e.g., the value of the offset current $i_{OS}$, insofar as the mirroring factor is equal to $i_{OS}/i_2$) and the value of resistance $R_{Trim}$ of the resistors $R1_T$ and $R2_T$. For instance, according to the exemplary dimensioning previously presented, such values may be selected by enforcing the following relationship:

$$I_0=(i_A-i_{OS}) \cdot 2560$$

$$\alpha=(r2/(r1+r2)) \cdot 2560/(2 \cdot R_{Trim})$$

It will otherwise be noted that the specific implementation of a variable load circuit 104 illustrated in FIG. 4, and the related trimming methodology, are just one example of implementation of one or more embodiments. Other embodiments may be based on a different architecture of the trimmable load circuit 104, such as the architecture exemplified in the circuit diagram of FIG. 7, which will now be described by way of comparison with FIG. 4.

Figure 7:
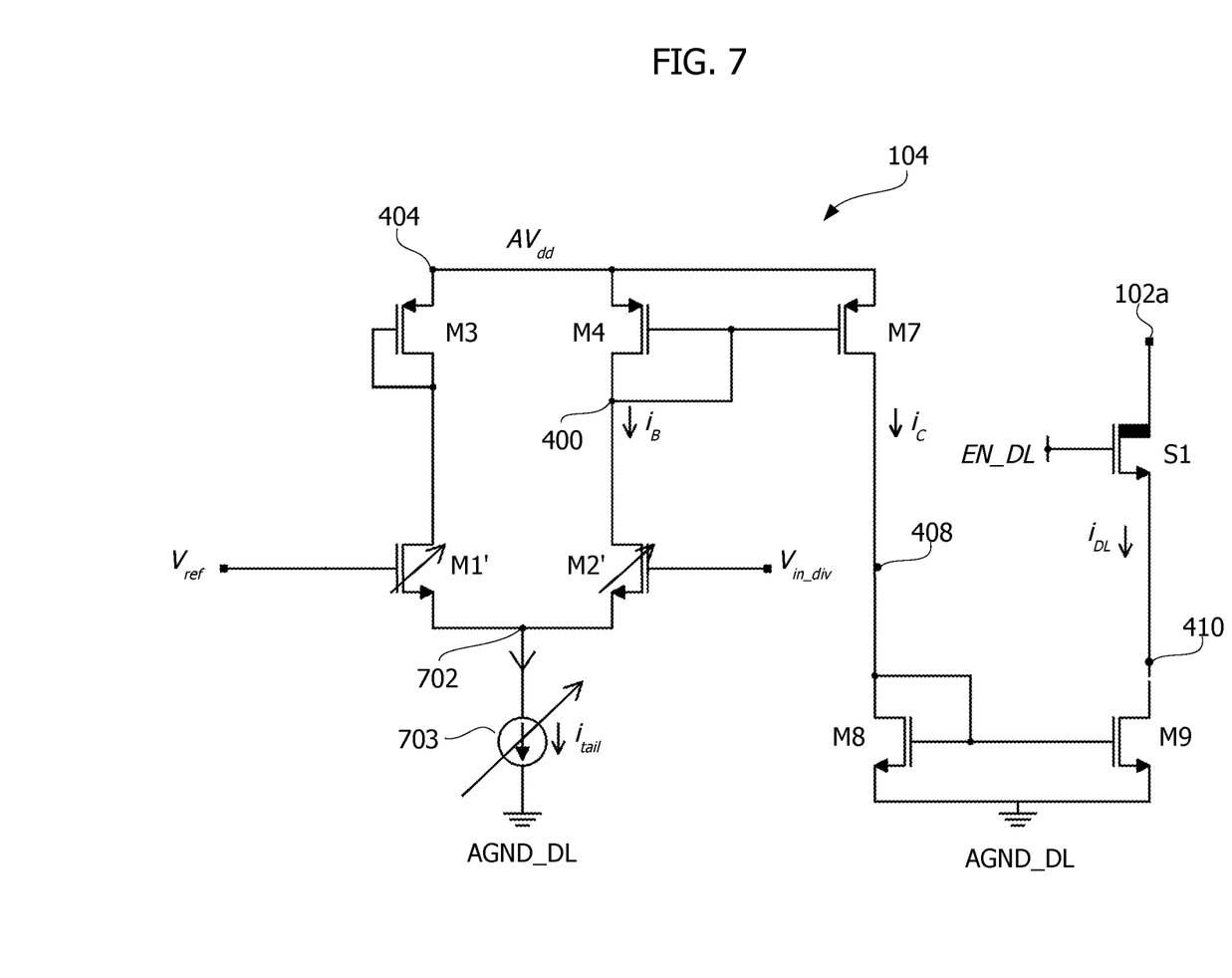
FIG. 7 is a circuit diagram exemplary of another possible implementation of a variable load circuit according to one or more embodiments of the present description.

In the embodiment of FIG. 7, the source terminals of transistors M1' and M2' of the differential input pair are coupled to a same node 702, and a variable current source 703 is arranged between node 702 and ground node AGND_DL to sink a variable tail current $i_{tail}$ from node 702. Therefore, differently from the embodiment of FIG. 4, no offset current is injected into node 400 (i.e., into the node between transistor M2' and transistor M4) and no variable resistors are provided in the tail of the input differential pair. The other elements of the variable load circuit 104 (e.g., the biasing transistor M3, the output current mirroring circuitry M4, M7, M8, M9, and the enabling switch S1) are substantially the same as in FIG. 4.

Figure 8:
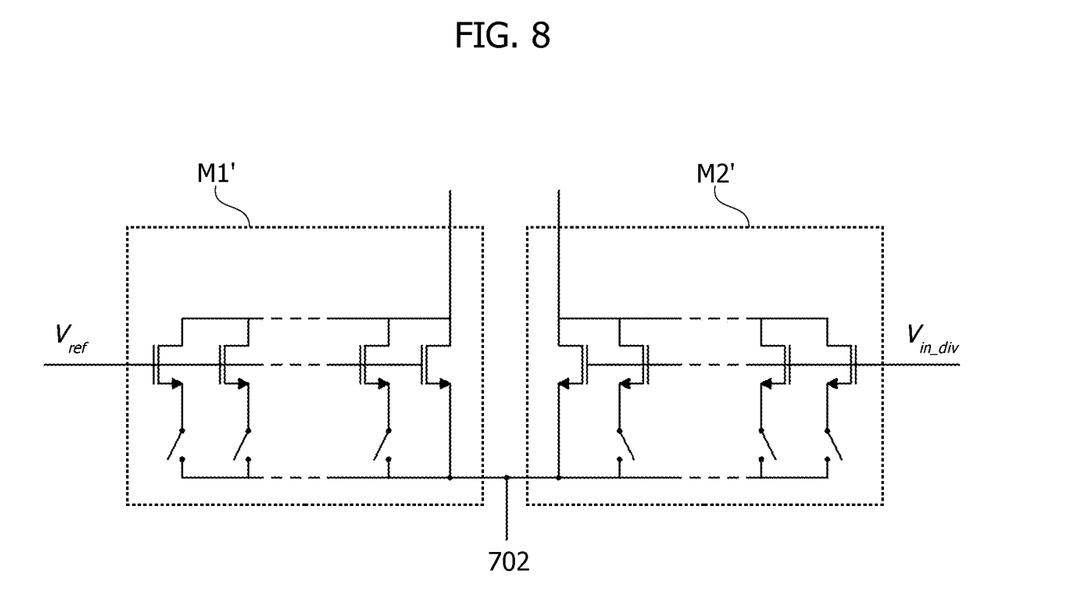
FIG. 8 is a circuit diagram exemplary of possible implementation details of the circuit of FIG. 7.

Thus, in one or more embodiments as exemplified in FIG. 7, trimming of the offset of the "$i_{DL}$ vs. $V_{in}$" curve may be implemented by changing the current $i_{tail}$ sunk from node 702 by the tail current generator 703, since the resulting offset is equal to $i_{OS}=i_{tail}/2 \cdot 32 \cdot 80 = i_{tail} \cdot 1280$). In one or more embodiments as exemplified in FIG. 7, the slope of the "$i_{DL}$ vs. $V_{in}$" curve can instead be trimmed by changing the transconductance $g_m$ of the differential pair M1', M2'. This can be achieved, for example, by implementing each of transistors M1' and M2' as a network of smaller transistors and switches as exemplified in FIG. 8, where the smaller transistors are configured to receive at their control terminals the same control signal (i.e., signal $V_{ref}$ for the transistors M1' and signal $V_{in}$ div for the transistors M2') and are selectively couplable in parallel to each other by controlling the switches that are coupled in series thereto. By changing the number of transistors that are connected in parallel (i.e., enabled), the overall transconductance of the differential pair is changed, thus changing the slope of the "$i_{DL}$ vs. $V_{in}$" curve. It is noted that, in one or more embodiments as exemplified in FIGS. 7 and 8, the transconductance of the differential pair depends on the value of the tail current $i_{tail}$, so that the transconductance (slope of $i_{HS}$) should be trimmed after the tail current $i_{tail}$ (offset of $i_{HS}$) has been trimmed.

One or more embodiments may thus provide one or more of the following advantages: high efficiency, insofar as the dummy load current $i_{DL}$ is only as large as it has to be for a certain value of the input voltage $V_{in}$, and no current is wasted uselessly; smaller current jump and efficiency drop when the converter enters diode mode operation; and lower quiescent current.

Without prejudice to the underlying principles, the details and embodiments may vary, even significantly, with respect to what has been described by way of example only, without departing from the extent of protection.

The claims are an integral part of the technical teaching provided herein in respect of the embodiments.

The extent of protection is determined by the annexed claims.

The invention claimed is:

1. A DC-DC boost converter circuit, comprising:
   first and second input terminals configured to receive an input voltage therebetween;
   first and second output terminals configured to produce an output voltage therebetween;
   a switching stage comprising a low-side switching transistor arranged between a switching node and a ground node, and a high-side switching transistor arranged between said switching node and said first output terminal, wherein said ground node is coupled to said second input terminal and to said second output terminal, and wherein said high-side switching transistor includes a body diode having an anode terminal coupled to said switching node and a cathode terminal coupled to said first output terminal;
   wherein said switching stage is configured for operation in an asynchronous operation mode where said low-side switching transistor is alternately driven to a conductive state and a non-conductive state, and said high-side switching transistor is steadily in a non-conductive state; and
   a variable load circuit selectively coupled between said first output terminal and said second output terminal when said switching stage is in said asynchronous operation mode to sink a load current from said first output terminal, and wherein said variable load circuit is configured to sink said load current having a value that is a function of a value of said input voltage.

2. The DC-DC boost converter circuit of claim 1, wherein said variable load circuit is configured to sink said load current where the value of said load current is linearly dependent on the value of said input voltage.

3. The DC-DC boost converter circuit of claim 1, wherein said variable load circuit comprises:
   a voltage input configured to receive a voltage indicative of said input voltage; and
   a current generator circuit configured to generate the load current that is sunk from said first output terminal in response to the voltage received at the voltage input.

4. The DC-DC boost converter circuit of claim 3, wherein said load current is adjusted as a function of a stored slope trimming value.

5. The DC-DC boost converter circuit of claim 4, wherein said variable load circuit includes a trimmable resistance for said current generator circuit, and the trimmable resistance is adjusted in response to the stored slope trimming value.

6. The DC-DC boost converter circuit of claim 3, wherein said load current is adjusted as a function of a stored offset trimming value.

7. The DC-DC boost converter circuit of claim 6, wherein said variable load circuit includes a trimmable current mirror for said current generator circuit, and a mirroring ratio of said trimmable current mirror is adjusted in response to the stored offset trimming value.

8. The DC-DC boost converter circuit of claim 1, wherein said variable load circuit comprises:
   a differential input pair comprising a first input transistor and a second input transistor, wherein said first input transistor has a control terminal configured to receive a reference voltage, and wherein said second input transistor has a control terminal configured to receive a voltage indicative of said input voltage and is configured to sink a transistor current from a current adder node; and
   a current mirror circuit arrangement coupled to said second input transistor at said current adder node and configured to mirror and re-scale a current sunk by said current adder node to produce said load current;
   wherein said load current sunk by said variable load circuit is produced as a function of said transistor current sunk by said second input transistor from said current adder node.

9. The DC-DC boost converter circuit of claim 8, wherein said variable load circuit comprises a voltage divider circuit configured to receive said input voltage and produce, at an intermediate node thereof, said voltage indicative of said input voltage.

10. The DC-DC boost converter circuit of claim 8, wherein said variable load circuit comprises:
    a first trimmable resistor coupled between said first input transistor and a current biasing node, and a second trimmable resistor coupled between said second input transistor and said current biasing node;
    a current source coupled between said current biasing node and said ground node and configured to sink a biasing current from said current biasing node;
    a further current source coupled between a further current biasing node and said ground node and configured to sink a further biasing current from said further current biasing node; and
    a further trimmable current mirror circuit arrangement configured to mirror and re-scale said further biasing current to inject an offset current into said current adder node.

11. The DC-DC boost converter circuit of claim 10, wherein resistance values of said first trimmable resistor and said second trimmable resistor are trimmable as a function of a stored slope trimming value.

12. The DC-DC boost converter circuit of claim 10, wherein a mirroring ratio of said further trimmable current mirror circuit arrangement is trimmable as a function of a stored offset trimming value.

13. The DC-DC boost converter circuit of claim 8, wherein said first input transistor and said second input transistor are trimmable transistors and are directly coupled to a current biasing node; and wherein said variable load circuit comprises a trimmable current source coupled between said current biasing node and said ground node and configured to sink a variable biasing current from said current biasing node.

14. The DC-DC boost converter circuit of claim 13, wherein a transconductance value of said differential input pair is trimmable as a function of a stored slope trimming value.

15. The DC-DC boost converter circuit of claim 13, wherein a value of said variable biasing current is trimmable as a function of a stored offset trimming value.

16. A method of operating a DC-DC boost converter circuit, comprising:
receiving an input voltage between first and second input terminals;
producing an output voltage between first and second output terminals;
controlling operation of a switching stage in an asynchronous operation mode by driving a low-side switching transistor alternately to a conductive state and a non-conductive state and driving a high-side switching transistor steadily to a non-conductive state;
coupling a variable load circuit between said first and second output terminals when said switching stage is controlled in said asynchronous operation mode; and
sinking, via a variable load circuit, a load current having a value that is a function of a value of said input voltage.

17. The method of claim 16, wherein sinking comprises controlling said variable load circuit to sink said load current where the value is linearly dependent on said input voltage.

18. The method of claim 16, wherein sinking comprises:
sensing a difference between a reference voltage and a voltage indicative of said input voltage to generate a transistor current that is sunk from a current adder node;
mirroring and re-scaling the current sunk by said current adder node to produce said load current;
wherein said load current is produced as a function of said transistor current sunk.

19. A method of trimming a DC-DC boost converter circuit, comprising:
i) operating the converter circuit in an asynchronous operation mode for a selected value of an input voltage with no external load coupled to an output node;
ii) increasing a current output by the converter circuit until switching activity of the converter circuit does not skip pulses;
iii) storing a current value of the current output by the converter circuit at which the converter circuit stops skipping pulses;
iv) repeating steps i) to iii) for different selected values of the input voltage and storing the respective current values of the current output by the converter circuit at which the converter circuit stops skipping pulses;
v) determining at least one of a slope trimming value and an offset trimming value for a variable load circuit so that the variable load circuit sinks, at said selected values of the input voltage, a load current equal to or higher than said current output by the converter circuit; and
vi) trimming one or more trimmable resistors of the variable load circuit as a function of said slope trimming value, and/or trimming a trimmable current mirror circuit arrangement of the variable load circuit as a function of said offset trimming value.

20. A method of trimming a DC-DC boost converter circuit, comprising:
i) operating the converter circuit in an asynchronous operation mode for a selected value of an input voltage with no external load coupled to an output node;
ii) increasing a current output by the converter circuit until switching activity of the converter circuit does not skip pulses;
iii) storing a current value of the current output by the converter circuit at which the converter circuit stops skipping pulses;
iv) repeating steps i) to iii) for different selected values of the input voltage and storing the respective values of the current value of the output current by the converter circuit at which the converter circuit stops skipping pulses;
v) determining at least one of a slope trimming value and an offset trimming value for a variable load circuit so that the variable load circuit sinks, at said selected values of the input voltage, a load current equal to or higher than said current output by the converter circuit; and
vi) trimming a trimmable current source of the variable load circuit as a function of said offset trimming value, and/or trimming trimmable input transistors of the variable load circuit as a function of said slope trimming value.

* * * * *